United States Patent Office 3,185,544
Patented May 25, 1965

3,185,544
PREPARATION OF CRYSTALLINE ZEOLITES OF UNIFORM AND CONTROLLED PARTICLE SIZE
Philip K. Maher, Baltimore, Md., assignor to W. R. Grace & Co., New York, N.Y., a corporation of Connecticut
No Drawing. Filed July 2, 1962, Ser. No. 207,033
4 Claims. (Cl. 23—112)

This invention relates to a process for preparing synthetic zeolites. In one specific aspect, it relates to a method for preparing synthetic crystalline zeolites having a uniform and controlled particle size.

Synthetic zeolites are crystalline metal alumino silicates with the three dimensional network structure of silica and alumina tetrahedra. The zeolite structure is characterized by a repeating three dimensional network of large alumino-silicate cages connected by small uniform openings or pores.

The use of synthetic crystalline zeolites as microselective adsorbents is well known in the art. Little concern is given to the particle size of zeolites to be used as microselective adsorbents because it makes little difference in their effectiveness as adsorbents.

However, in other applications particle size of the zeolite is of vital importance. It is when preparing zeolites for use as catalyst supports, components of petroleum cracking catalysts or the like that my invention is especially applicable.

In many polymerization processes, for instance, the product is recovered and used without first removing the catalyst residue. This is especially true with rubbers and some olefin polymers. The catalyst carrier that remains in the product then acts as a filler in the plastic material. It is necessary in these cases that the catalyst support be of a uniform size so that when it subsequently acts as a filler, it will enhance, rather than diminish, the desirable properties of the plastic. Thus, it is important that if zeolites are to be used as the catalyst supports, they be of uniform particle size.

The use of zeolites in petroleum cracking catalysts illustrates another case where control of particle size is necessary. These catalysts are often prepared with as much as 10–25% zeolite in their composition. However, the zeolite used must be of fine particle size in order to produce a good attrition resistant catalyst.

In the past it has been impossible to prepare a selected zeolite having a controlled particle size. In other words, the particle size of the product was determined by the concentration of reactants. And further, the concentration of reactants was determined by the composition of the zeolite which it was desired to prepare. Therefore, it has been impossible to prepare any single zeolite in more than one particle size.

I have now discovered a process for preparing synthetic crystalline zeolites having a selected particle size.

It is well known in crystal chemistry that crystallization generally takes place by solubilization of the reactants followed by recrystallization of the product. By this method the particle size of the product is determined by concentration of the reactants.

In contrast to the results normally obtained, I have found that by using clay of a selected particle size as my starting material, a crystalline zeolite of the same particle size can be produced. It is in this way that the particle size can be controlled.

Briefly, the process consists of selecting kaolin type clay of the desired particle size, calcining the selected clay, treating it with sodium hydroxide under appropriate conditions and finally, recovering a crystalline zeolite product having the same particle size as the clay starting material.

The fact that a zeolite of controlled particle size can be obtained by the process of my invention demonstrates that a novel intra-particle re-arrangement takes place rather than the usual solubilization and recrystallization.

The kaolin clay raw material is fractionated by any standard technique such as ultracentrifugation or water elution. The fraction of appropriate particle size is then used for preparing the crystalline zeolite desired. Crystalline zeolites have the approximate composition $$Na_2O.Al_2O_3.zSiO_2.nH_2O$$

where $z$ is a number between 2 and 10 and $n$ is a small number.

A general preparation of the zeolites will be given here since this invention is applicable to all synthetic crystalline zeolites made with clay as a starting material. Detailed preparations of specific zeolites are described in copending applications Serial Nos. 850,757, filed November 4, 1959, and 158,895, filed December 12, 1961.

Briefly, in these processes, the clay of appropriate particle size is calcined between 500–800° C. for about 2 to 18 hours. Two to four hours at 700° C. generally gives satisfactory results. The calcined clay is then mixed at ambient temperature with the required amount of aqueous sodium hydroxide (with or without hydrous silica) and then aged at ambient temperature for an appropriate time, about 2 to 120 hours. Aging for 18 hours gives satisfactory results in most cases. After aging, the reactant mixture is heated and maintained at an elevated temperature (between 90–110° C.) until crystallization of the desired zeolite is complete.

The crystalline product is recovered from the reactant mixture by conventional means (i.e., filtration, decantation, centrifugation) and is washed with water. The wet zeolite is activated by heating to 350–500° C. for 1 to 3 hours. The product has the same particle size as that of the clay raw material.

The kaolin raw material is generally available in a particle size range of 0.1 to 5 microns. It is possible then, to prepare any zeolite in this same particle size range by my method.

Although kaolin is used in the description of my process, other kaolin type clays are suitable, such as halloysite, ball clay and fire clay. Montmorillonite type clays are also suitable.

By proper adjustment of reaction conditions, synthetic equivalents of the natural zeolites such as chabazite, phillipsite and faujasite can be prepared with a controlled particle size by this method.

My invention will be further explained by the following specific, but non-limiting examples.

*Example 1*

A 264 gram quantity of kaolin clay having a particle size of less than 1 micron was calcined at 700° C. for 2 hours. The resulting 227 g. of metakaolin were treated with 209 grams of 40° Bé. sodium silicate sol (containing 60 g. $SiO_2$+20 g. $Na_2O$+129 g. $H_2O$), 381 grams of NaOH pellets and 3450 grams of $H_2O$.

The mixture was aged at 25° C. for 4 days with vigorous agitation. It was then heated to 100° C. and maintained at that temperature for 8 hours, filtered and the product recovered. The material was washed with 4 liters of deionized water and dried at 110° C. The dry product was a pure crystalline zeolite having the approximate empirical formula $Na_2O.Al_2O_3.2.5SiO_2.nH_2O$ (known as Z–14–Na) with an effective pore size of 13 Angstrom units and a particle size of less than 1 micron.

The particle sizes of the clay starting material and the final product were determined by electron miscroscopy.

Example II

Another run was made to prepare a different zeolite of controlled particle size.

A 116 gram portion of kaolin clay having a particle size of less than 1 micron was calcined for 2 hours at 700° C. The calcined kaolin, weighing 100 grams, was treated with 104 grams of NaOH dissolved in 910 grams of water. The mixture was aged at 45° C. for 18 hours. It was then reacted for 6 hours at 100° C. The mixture was filtered to recover the product. The material was then washed with 3 liters of deionized water and dried at 110° C. The dry product was a crystalline zeolite having the approximate empirical formula $$Na_2O \cdot Al_2O_3 \cdot 2SiO_2 \cdot nH_2O$$

with an effective pore size of 4.5 Angstrom units (known as Z-12L-Na) and a particle size of less than 1 micron.

The particle sizes of both the raw material and product were determined as in Example I.

I claim:

1. A process for preparing crystalline selective absorptive zeolites from clay composed of distinct particles of definite size within the range of about 0.1 to 5 microns which comprises segregating particles of clay of a desired size within said range, calcining the segregated clay particles by heating to drive off the water of constitution, reacting the segregated particles with an appropriate quantity of sodium hydroxide and hydrous silica to prepare the desired zeolite and recovering the product zeolite.

2. A process for preparing crystalline selective absorptive zeolites having the approximate gross composition $Na_2O \cdot Al_2O_3 \cdot zSiO_2 \cdot nH_2O$ where $z$ is a number between 2 and 10 and $n$ is a small number and having an effective pore size of about 3 to 13 Angstrom units composed of distinct particles of definite size within the range of about 0.1 to 5 microns which comprises segregating particles of clay of a desired size within said range, calcining the segregated clay particles by heating to drive off the water of constitution, aging said calcined clay in an aqueous solution of sodium hydroxide and hydrous silica followed by heating said aged mixture until conversion to the zeolite is complete, the weight ratio of reactants being 0.81 to 33 parts of water, 0 to 5 parts of seilica, 0.36 to 3.6 parts of sodium hydroxide per part of calcined clay in said sodium hydroxide-hydrous silica solution, and isolating the said hydrated zeolite from the reaction mixture.

3. A process for preparing crystalline selective adsorbtive zeolites having the approximate gross composition $Na_2O \cdot Al_2O_3 \cdot 2.5SiO_2 \cdot nH_2O$ where $n$ is a small number and having an effective pore size of about 13 Angstrom units composed of distinct particles of definite size within the range of about 0.1 to 5 microns which comprises segregating particles of clay of a desired size within said range, calcining the segregated particles at 500–800° C., for about 2 to 18 hours, aging said calcined clay in an aqueous solution of sodium hydroxide and hydrous silica, heating said aged mixture until conversion to the zeolite is complete, the ratio of reactants being 9 to 20 parts of water, 0.2 to 0.4 part of silica, 0.9 to 2 parts of sodium oxide per part of calcined clay in said sodium hydroxide solution and isolating the solid hydrated zeolite thus formed from the reaction mixture.

4. A process for preparing crystalline selective adsorbtive zeolites having the approximate gross composition $Na_2O \cdot Al_2O_3 \cdot 2SiO_2 \cdot nH_2O$ wherein $n$ is a small number and having an effective pore size of about 4.5 Angstrom units composed of distinct particles of definite size within the range of about 0.1 to 5 microns which comprises segregating particles of clay of a desired size within said range, calcining the segregated particles at 500–800° C. for about 2 to 18 hours, aging said calcined clay with aqueous sodium hydroxide, heating said aged mixture until conversion to the desired zeolite is complete, the ratio of reactants being 0.70 to 2.6 parts of calcined clay and 7.5 to 25 parts of water per part of sodium oxide in said sodium hydroxide solution, and recovering the solid hydrated zeolite thus formed from the reaction mixture.

References Cited by the Examiner

UNITED STATES PATENTS

| | | | |
|---|---|---|---|
| 2,544,695 | 3/51 | Kumins. | |
| 2,992,068 | 7/61 | Haden et al. | 23—112 |
| 3,114,603 | 12/63 | Howell | 23—113 |

FOREIGN PATENTS 594,512   9/60   Belgium.

OTHER REFERENCES

Kumins et al.: "Ind. and Eng. Chem.," volume 45, No. 3, 1953, pages 567–572 (page 571 of special interest).

MAURICE A. BRINDISI, *Primary Examiner.*